United States Patent
van Rozen et al.

(10) Patent No.: US 9,854,296 B2
(45) Date of Patent: Dec. 26, 2017

(54) DISTRIBUTED SYSTEM ARCHITECTURE FOR CONTROL OF A SET TOP BOX

(75) Inventors: Riemer Andries van Rozen, Amsterdam Zuidoost (NL); David Bonfrer, Vriezenveen (NL)

(73) Assignee: Echostar Technologies L.L.C., Englewood, CO (US)

(*) Notice: Subject to any disclaimer, the term of this patent is extended or adjusted under 35 U.S.C. 154(b) by 0 days.

(21) Appl. No.: 13/327,539

(22) Filed: Dec. 15, 2011

(65) Prior Publication Data
US 2013/0160064 A1  Jun. 20, 2013

(51) Int. Cl.
*H04N 21/24* (2011.01)
*H04N 21/436* (2011.01)
*H04N 21/443* (2011.01)

(52) U.S. Cl.
CPC ... *H04N 21/43615* (2013.01); *H04N 21/4433* (2013.01)

(58) Field of Classification Search
CPC .................................................. H04N 21/2404
USPC ........ 709/226, 223, 203; 358/1.15; 370/503; 725/110
See application file for complete search history.

(56) References Cited

U.S. PATENT DOCUMENTS

| | | | | |
|---|---|---|---|---|
| 5,838,678 A | * | 11/1998 | Davis | H04N 21/23608 348/E5.008 |
| 2006/0101495 A1 | * | 5/2006 | Yoshida et al. | 725/78 |
| 2006/0209900 A1 | * | 9/2006 | Sekaran et al. | 370/503 |
| 2007/0022156 A1 | * | 1/2007 | Grubbs | H04L 65/4069 709/203 |
| 2007/0130177 A1 | * | 6/2007 | Schneider | G06F 17/30017 |
| 2007/0256003 A1 | * | 11/2007 | Wagoner | G06F 17/3089 715/205 |
| 2007/0271367 A1 | * | 11/2007 | Yardeni | G06Q 10/107 709/223 |
| 2008/0298388 A1 | * | 12/2008 | White | H04N 7/163 370/468 |
| 2009/0172792 A1 | * | 7/2009 | Backhouse | G06F 21/33 726/6 |
| 2010/0235430 A1 | * | 9/2010 | Kim | 709/203 |
| 2010/0313223 A1 | * | 12/2010 | Straub | 725/60 |
| 2010/0324855 A1 | * | 12/2010 | Parker | G06F 11/2294 702/119 |
| 2011/0029593 A1 | * | 2/2011 | Howard et al. | 709/203 |
| 2011/0063667 A1 | * | 3/2011 | Nishida | 358/1.15 |
| 2011/0206136 A1 | * | 8/2011 | Bekedam | G06F 11/3664 375/240.25 |
| 2011/0282934 A1 | * | 11/2011 | Chalana et al. | 709/203 |
| 2011/0282997 A1 | * | 11/2011 | Prince et al. | 709/226 |
| 2012/0117141 A1 | * | 5/2012 | Beaver et al. | 709/203 |
| 2012/0215834 A1 | * | 8/2012 | Chen et al. | 709/203 |
| 2013/0125171 A1 | * | 5/2013 | Sharif-Ahmadi et al. | 725/43 |

(Continued)

*Primary Examiner* — Dominic D Saltarelli
(74) *Attorney, Agent, or Firm* — Kilpatrick Townsend & Stockton LLP

(57) ABSTRACT

A distributed system architecture is described for control of a Set Top Box (STB). The architecture employs server software implemented as JSON middleware, and provided on the STB 32 as a local server, as well as on a Tooling Device 34 and a Control Application 36. The distributed system facilitates communication with the STB over a data network such as the internet. A remote client device running a browser 30 can interact with the STB 32 to access STB functionality 32.

13 Claims, 6 Drawing Sheets

(56) References Cited

U.S. PATENT DOCUMENTS

| | | | |
|---|---|---|---|
| 2013/0132932 A1* | 5/2013 | Van Rozen | G06F 8/41 717/124 |
| 2013/0160064 A1* | 6/2013 | van Rozen | H04N 21/4433 725/110 |
| 2013/0205329 A1* | 8/2013 | Markley et al. | 725/25 |

* cited by examiner

Protocol Service

| Field | value |
|---|---|
| Service.v | 0.1 |
| Service.name | SOJ |
| Service.purpose | The Service Oriented JavaScript (SOJ) protocol manages communication channels and service sessions for JavaScript service |
| Service.schemas[0] | Service schema |
| Service.schemas[1] | Connect schema |
| Service.schemas[2] | Session schema |
| Service.schemas[3] | Disconnect schema |
| Service.schemas[4] | Provider schema |
| Service.interface[0].name | protocol |
| Service.interface[0].operations[0].name | publish |
| Service.interface[0].operations[0].pattern | out |
| Service.interface[0].operations[0].output | Provider |
| Service.interface[0].operations[1].name | connect |
| Service.interface[0].operations[1].pattern | in-out |
| Service.interface[0].operations[1].input | Connect |
| Service.interface[0].operations[1].output | Session |
| Service.interface[0].operations[2].name | disconnect |
| Service.interface[0].operations[2].pattern | in |
| Service.interface[0].operations[2].input | Disconnect |

FIG. 6

DISTRIBUTED SYSTEM ARCHITECTURE FOR CONTROL OF A SET TOP BOX

TECHNICAL FIELD

The invention relates to a distributed system architecture for control of a Set-Top Box (STB), and in particular to a system comprising JSON middleware facilitating communication between the STB and a web browser.

BACKGROUND

In recent years, Web 2.0 technology has matured into a powerful means for creating user friendly, feature rich, interactive user interface clients, which are separated from server storage. This technology, referred to as Asynchronous JavaScript and XML (AJAX), runs natively on every modern web browser and has a wide application area, ranging from web based e-mail clients to web stores and database viewer applications. The separation between data storage, server behaviour and client user interfaces (without the need for plug-ins) offers advantages such as re-use of common technology, portability and interoperability, which make it a compelling alternative to hard coded user interfaces (UI).

Set Top Boxes (STBs) allow audio and video content to be viewed in the home. Typically, an STB will receive available audio and video content for viewing either through broadcasts that are transmitted over antenna, cable, or satellite based transmission systems, or increasingly, via an internet connection or other cable connection from a provider who makes content available on an on-demand, streamed or downloaded basis. In addition to the necessary means for receiving and decoding audio and video content, STBs have at least an internal processor on which software code embodying an operating system runs, a memory in which audio and video content and control data can be stored, and the hardware and software to support a network connection, such as the internet (in this respect, STBs can be thought of as computerised systems, functionally equivalent to general purpose computers, but distinguishable by virtue of their dedicated purpose and the associated hardware and software that is provided by the manufacturer to support that purpose).

Under the command of the control software operating on the STB processor, audio and video content is manipulated and transmitting to an STB output for display on screen. Like general purposes computers, an STB will therefore typically provide a suitable User Interface (UI), either encoded as control data or as part of the operating system, for displaying options on the screen connected to the STB output. User interfaces are presented to allow the user to select content for viewing and/or recording, and to access other functionality such as an Electronic Program Guide, or services provided over an Internet connection. Separate user interfaces may also be provided to STB engineers who wish to carry out maintenance on the STB, or debug software during trial operations.

It costs considerable time and effort to develop and maintain user interfaces, as to do so it is necessary to employ software engineers who understand the proprietary code installed on the STBs and provide an interface that meets the ever expanding requirements of STB developers. With different STBs designs on the market, running essentially different operating system code, this problem is increasingly complex. The user interface can only be changed in compile time, and has considerable dependency on other parts of the code. This makes it difficult if not impossible to dynamically replace the UI with an alternative UI, where an STB developer wishes to use a new design, and also prevents reuse of UI across different STB platforms. The embedded nature of the UI code, also means that any adjustments that are required to meet new customer expectations or to update the UI to meet new STB developer requirements are difficult and costly. It is not yet possible for the customer or for third parties to make adjustments to the UI themselves, even though the customer's wishes regarding STB features and its graphical user interface may change over time within the software life cycle (before a new UI is downloaded and installed).

Furthermore, when an STB does not function as expected, either due to a software fault, or due to a misunderstanding of the STB operation, a customer will typically call customer support. In any ensuing call with a service engineer, basic command and control settings may be downloaded to a STB via any of the transmission means noted above However, traditional means of support do not allow an engineer or a customer help desk operator to remotely customize the settings of the STB and to remotely determine the cause of any technical issues and resolve a customer's concerns quickly.

We have therefore appreciated that it would be desirable to provide a distributed system architecture that allows the display and control functionality of the STB to be tailored flexibly, allowing customer expectations to be met, allowing engineers to make more dynamic and responsive changes to the available functionality and look of the STB experience, without needing to wait for the end of the current software lifetime and the installation of the next large-scale software product.

We have also appreciated that it would be desirable to provide for increased control of the STB over the Internet, to allow for better maintenance, diagnostic and upgrade operation to be carried out.

BRIEF DESCRIPTION OF THE DRAWINGS

Embodiments of the invention will be described by way of example and with reference to the drawings in which:

FIG. 6 is a table illustrating the service protocol; and

DETAILED DESCRIPTION OF THE PREFERRED EMBODIMENTS

Example embodiments of the invention provide a distributed system architecture that allows the display and control functionality of an STB to be manipulated over an internet connection. In a particular example, the architecture is Service Orientated and takes the form of a client server system middleware. In this regard, the term Service Oriented Architecture (SOA) will be understood to refer to a way of logically defining a software system that provides services to either end-user applications or to other services distributed in the network via published and discoverable interfaces.

Further, in distributed computing, middleware is the software that allows application modules to make remote calls from one machine to another via a network. In general the applications running on middleware, which may be viewed as a layer, may be distributed across heterogeneous systems.

Figure 1:
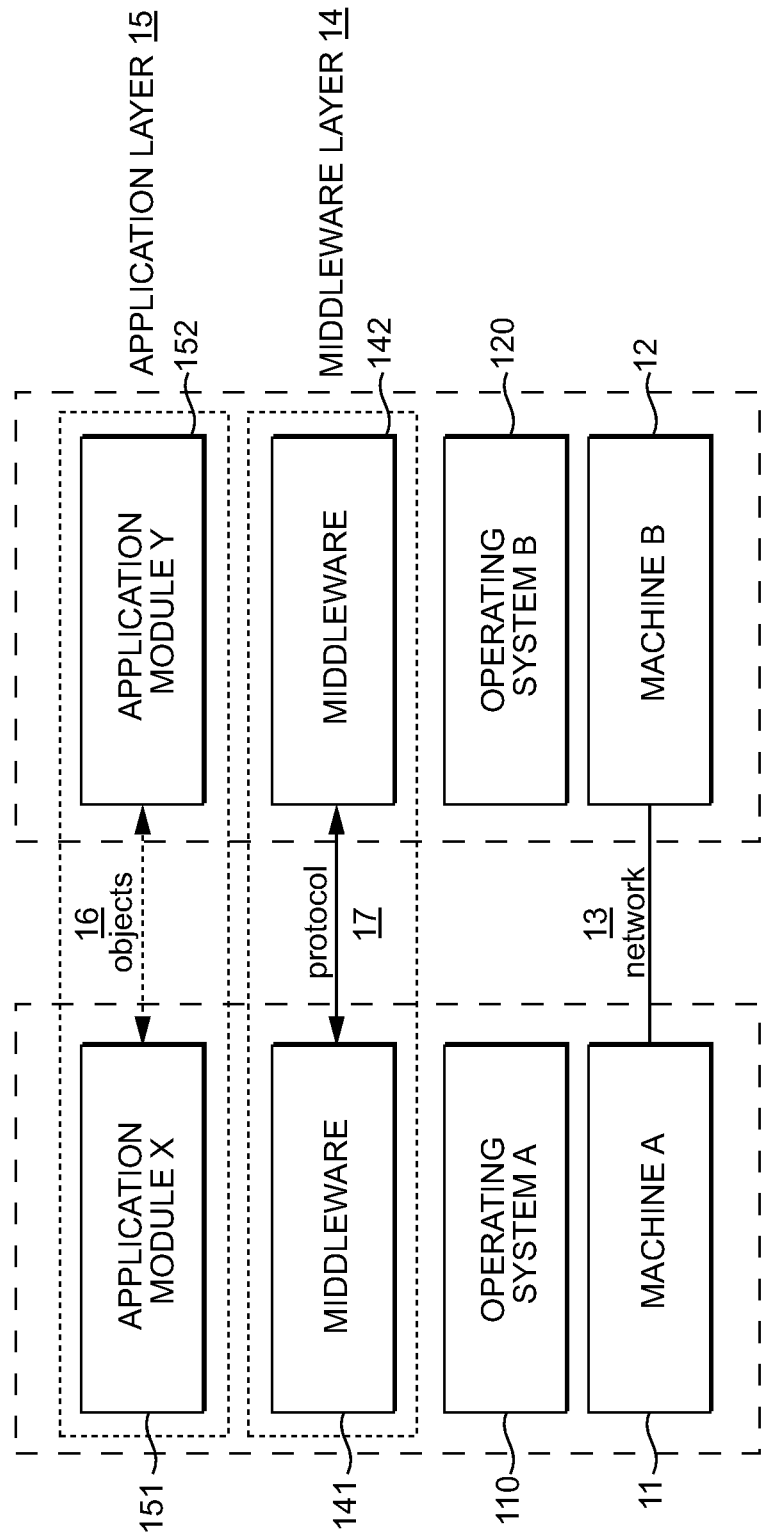
FIG. 1 is a schematic illustration of a middleware software implementation.

A simplified context diagram of middleware is shown in FIG. 1. In FIG. 1 two computers 11 and 12, illustrated as "Machine A" and "Machine B" are in communication with one another over a network 13. In this example, each computer 11 and 12 runs a different respective operating system, "Operating System A" 110 and "Operating System B" 120, that are stored in the respective memories of each computer. The software code running on each computer 11 and 12 can be thought of as comprising a middleware layer 14 and an application layer 15. For example, middleware 141 installed on computer 11, logically sits between "application module X" 151 which is running on computer 11, and the operating system 110. Similarly, middleware 142 installed on computer 12, logically sits between "application module Y" 152 which is running on computer 12, and the operating system 120.

As will be known to the skilled person, in object orientated computer environments and languages, Application Module X 151 and Application Module Y 152 may communicate by means of logical entities known as objects 16. Simply put, objects are defined by software definitions, and instances of objects exist to embody information within the distributed computer. In order to use objects for communication between applications running on different computers, an object representing a message must be created in the runtime environment of one application, say Application Module X 151, subsequently passed via various transmission protocols to the physical layer of the network (the hardware and the necessary software protocols for controlling the hardware) for transmission to the computer on which the destination application, say Application Module Y 152 is located, and transmitted. Once received at computer 12, the message will then be passed back up the various transmission protocols and interpreted in application Module Y.

Within middleware also, a serialization format is used to send and receive objects as messages between distributed components. These objects can be accessed as named, typed values at run-time, in a literal notation. Example literal serialization formats are the Extensible Markup Language (XML) and the JavaScript Object Notation (JSON), which can be referred to as "JSON literal". These languages are native to all modern Web Browsers and may be regarded as common, platform independent technology. As will be explained in more detail later, communication with the middleware layer 14 can be achieved by specifying communication paths in a protocol 17.

Web services are similar to middleware in that they are software systems designed to allow communication between two electronic devices over a network and typically embodied by self-describing, self-contained software modules available via the network. They are therefore typically distributed across existing network architectures and make use of existing network protocols such as HTTP and other commonly agreed mechanisms. Web services may be used to complete tasks, solve problems, and conduct transaction on behalf of a user or application. In this context, the self-contained software modules are typically designed to perform a single task, and encompass their own specification in terms of operations, parameters, data types and access protocols in such a way that the specification can be used to form a contract with other software modules. The contract determines what the module does, how to invoke its functionality, and what is expected as a result.

Web services are described in the Web Service Description Language (WSDL) which consists of a functional part for describing service behaviour characteristics and a non-functional part which mainly describes the service hosting environment. The software modules may be dynamically discovered and included into applications, and may be composed with other services to provide a particular function, solve a specific problem or deliver a particular solution to a customer or another service via existing processes such as e.g. Universal Description, Discovery and Integration (UDDI). Web services are useful as they allow a distributed infrastructure to be built up from interacting application modules, which communicate with each other via the network to form a single composed system.

The web services provided by the invention are distinguished from traditional middleware in that they are loosely coupled software modules, for which the service interfaces are specified in a neutral manner that is platform-, OS- and language-independent.

A particular example of the invention comprises a JSON middleware distributed asynchronous system architecture, which exposes STB functionality (such as selected elements of the state and the behaviour of the STB) using web services to web client applications that can subsequently view and control the STB. The web services can be exposed via the WSDL JSON dialect, while a Web 2.0 user interface based on Asynchronous JavaScript and XML (AJAX) is also provided. Clients may therefore be hosted on the STB and accessed using a web browser running on another computer or on the STB. The middleware itself can be implemented in the form of a Software Development Tool Kit or SDK for embedded devices, and operates as an asynchronous real-time service oriented embedded middleware.

Figure 2:
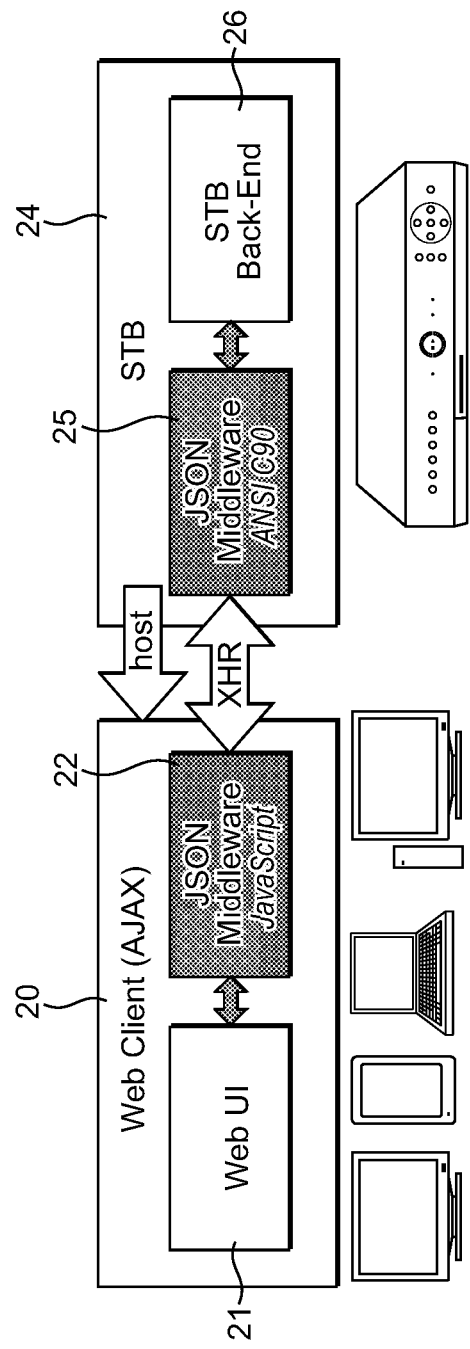
FIG. 2 is a schematic illustration of a first aspect of an example of the invention.

The configuration is illustrated by way of example in FIG. 2, which shows an AJAX based web client 20 comprising a user interface (UI) 21 in communication with installed JSON middleware 22. In the web client environment, the JSON middleware can for example be implemented in Javascript. The STB 24 similarly has JSON middleware 25 for communication with the JSON middleware 22 of the web client 21, via a communication protocol such as XHR (XMLHttpRequest). In the STB environment, the JSON middleware can for example be implemented in a C programming language, such as ANSI C90. STB 24 also comprises a number of STB Back End modules 26 that implement the functionality of the STB, and that can communicate with the JSON middleware 25 to receive control inputs. As illustrated in FIG. 2, the web client 20 could be installed on a personal computer, such as a desktop, laptop or palmtop, a portable digital assistant or smart phone, a games console or handheld device, the computer based operating system of large screen televisions, and indeed any device that can provide similar functionality. Although the example JSON middleware architecture shown in FIG. 2 is intended to operate with AJAX based rich web clients it is not limited to such clients.

The JSON middleware will now be described in more detail and with reference to FIG. 3. As noted above, the JSON Middleware consists of software components that facilitate communication between distributed application modules by sending and receiving messages associated with services and remote procedure calls via a network. The distributed components communicate either as peers or with specific client/server roles. Communication between components is carried out by means of a JSON server, an embedded software component that maintains sessions, and that makes possible the exchange of sequences of messages in JSON object format with other JSON servers. Each JSON server therefore provides a service register in which these services, associated operations and communication channels are registered, so that they can be discovered by clients and other services at run time.

Figure 3:
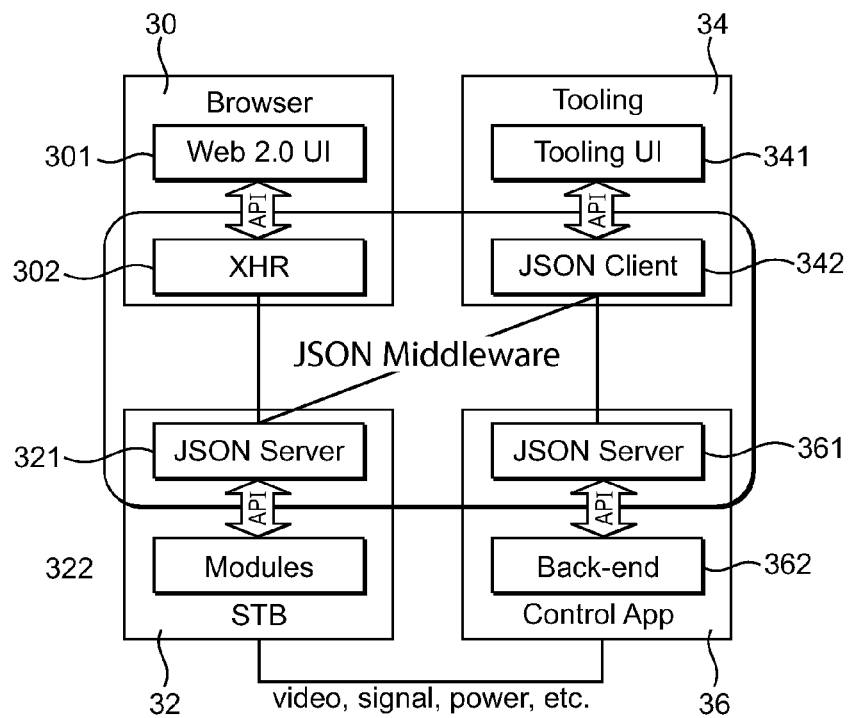
FIG. 3 is a schematic illustration of an example of the invention, in a wider context.

FIG. 3 shows four different distributed application modules, including a browser module 30, an STB module 32 (such as those shown in FIG. 2), a tooling module 34 for testing, and a Control Application module 36. Within each module, functional components are represented as separate entities for the purposes of illustration. The browser module 30 therefore has a user interface, in this example Web 2.0 UI 301, as well as an XHR (XMLHttpRequest) API module 302. XHR is an API available in web browser scripting languages, such as Javascript, and is used for sending HTTP or HTTPS requests to web servers and for loading the server response data.

Modules 32 and 36 in FIG. 3 can be seen to comprise respective JSON servers 321 and 361, which as JSON middleware allow communication with the other modules 30, 32, 34 and 36. The STB module 32 comprises JSON server 321 and STB modules 322 encoding the STB's standard functionality. The Tooling Module 34 comprises a Tooling User Interface 341 and JSON Client module 342, acting as the JSON middleware, while the Control Application module 36 comprises the JSON server 361 and the back end control modules 362. The Tooling Device 34 can be used to run debugging and routines on the STB software, during routine maintenance operations, and therefore acts as a client to the STB module 32 and Control Application 36. Control Application 36 can be used to send control signals to the STB during maintenance and upgrade operations, and to the Tooling Device for synchronisation. For example, it may be desirable during a maintenance operation to remotely control the STB to activate its power switches, tuning operations, user interfaces inputs and so on. The functionality required to do this is contained within the back end control modules 362. Each of the JSON servers 321 and 261 and the JSON client module 342 can also act as respective client/server processes for other modules in the middleware.

In this example, the STB module JSON server 321 can communicate via the XHR API 302 with the Browser module user interface 301, and with the JSON server 342 in the Tooling Module 34. Similarly, the JSON Server 342 in the Tooling Module 34 can communicate with the JSON server 321 in the STB and with the JSON server 361 in the Control Application module 36. The Control Application module 36 may also communicate directly with the STB 32. In other embodiments, it is possible that all of the JSON servers and the XHR can communicate with each other.

In this example, the remote client device 30 providing the browser, the STB 32, the Tooling Device 34 and the Control Application 36 are shown as physically and logically separate entities communicating by means of a data network such as the Internet. The data network could also be a telephone network such a wireless telephone network.

The Tooling Device 34 and the Control Application 36 need not be implemented in this way and could instead be provided on the same physical computer resource, or as a combined Tooling and Control Device.

As is shown in FIG. 3, the middleware comprises the various different JSON servers 321, 342, and 361 and the XHR protocol, as well as the various software support needed for them to operate. Central to the operation of the middleware therefore and the JSON Servers illustrated in FIG. 3 is the service description or Interface Description Language (IDL), described in JSON WSDL, which serves as a contract between the distributed concurrent asynchronous systems, and which describes the structure of the messages that may be transmitted in serialized form to remote method calls. In this example, the JSON Middleware uses JSON as object serialization format and a JSON dialect of WSDL as its IDL. It will be appreciated that a web service is a collection of resources defined by schemas, interfaces and operations which can be instanced and exposed via a session. In this sense, a service description therefore forms a contract between service providers and service consumers; services can be published by providers, discovered by consumers (clients) and composed to form complex services and applications. The contract is platform independent and language indiscriminative, and requests associated with messages can be processed synchronously or asynchronously (where the responses must be sent immediately following the request or may be sent out of order respectively).

Figure 4:
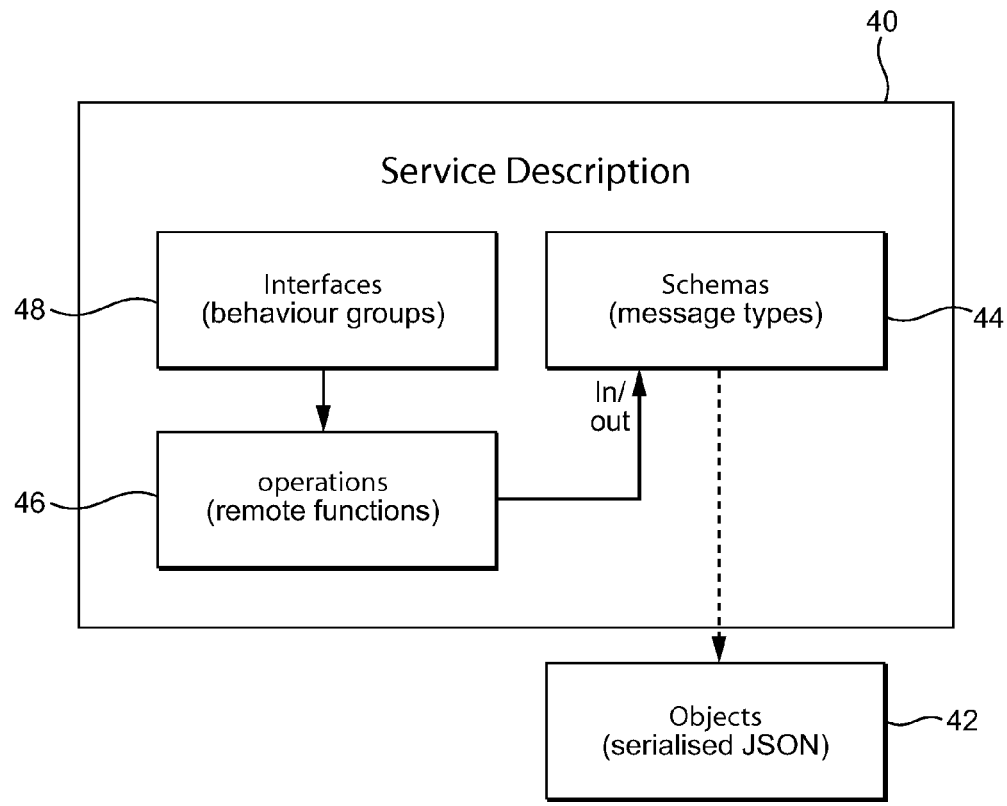
FIG. 4 is a further schematic illustration of an example of the invention

FIG. 4 is a schematic illustration of a service description, and can be seen to comprise objects 42, schemas 44, operations 46, and interfaces 48. An object 42 is a collection of fields with associated values and types that (in this example) conforms to the JavaScript Object Notation (JSON). Within the middleware, objects are messages that act as Remote Procedure Calls (RPCs) that travel within the middleware across the different operating systems and have an associated service operation behaviour. During the lifetime of a call message, the message may be pre-parsed, parsed and serialized to be transmitted as JSON character literals multiple times and be processed by concurrent asynchronous components within the distributed system architecture. Objects also include errors messages that can be returned to a debugger via the middleware.

Schemas 44 describe the structure of objects 42, specifying the namespace, types and values object fields may have and among other things may also describe optional parts, defaults and hidden elements. They therefore comprise the necessary schemas for defining message types and interfaces containing operations that embody the available behaviour of the system. In this example, the JSON format is used to describe the schemas, and as blueprints for the objects, and objects 42 may be validated against schemas by means of algorithms that are available in the JSON SDK and native JavaScript.

The system implements an API to manipulate object data via JSON schemas. A Schema instance therefore stores the Abstract Syntax Tree (AST) of the schema and the object it is manipulating. A JSON schema must never be parsed into an AST more than once since it never changes during the uptime of the system. The Service abstraction contains an interpreter which can, based on a service AST, generate Interface and Operation abstraction instances. The interpreter traverses the service AST, interface by interface, operation by operation, generating the necessary run-time environment.

Where schemas 44 define the structure of exchanged messages, operations 46 describe the pattern in which the message exchanges occur. Depending on the message exchange pattern operations have an associated input message type, output message type or both. Operations 46 have synchronous input-output patterns where the control flow of the sender stalls until the output is returned or asynchronous input-output patterns where sender and receiver operate asynchronously and concurrently.

Interfaces 48 define the overall behaviour of the middleware and service functionality and are used to logically group operations 46 together. WSDL is used to describe interfaces and these may be remotely invoked using XML formatted messages. Interface operation signatures are interpreted by the JSON middleware which adds services, interfaces and their operations to the engine's runtime for discovery via the service registry.

Figure 5:
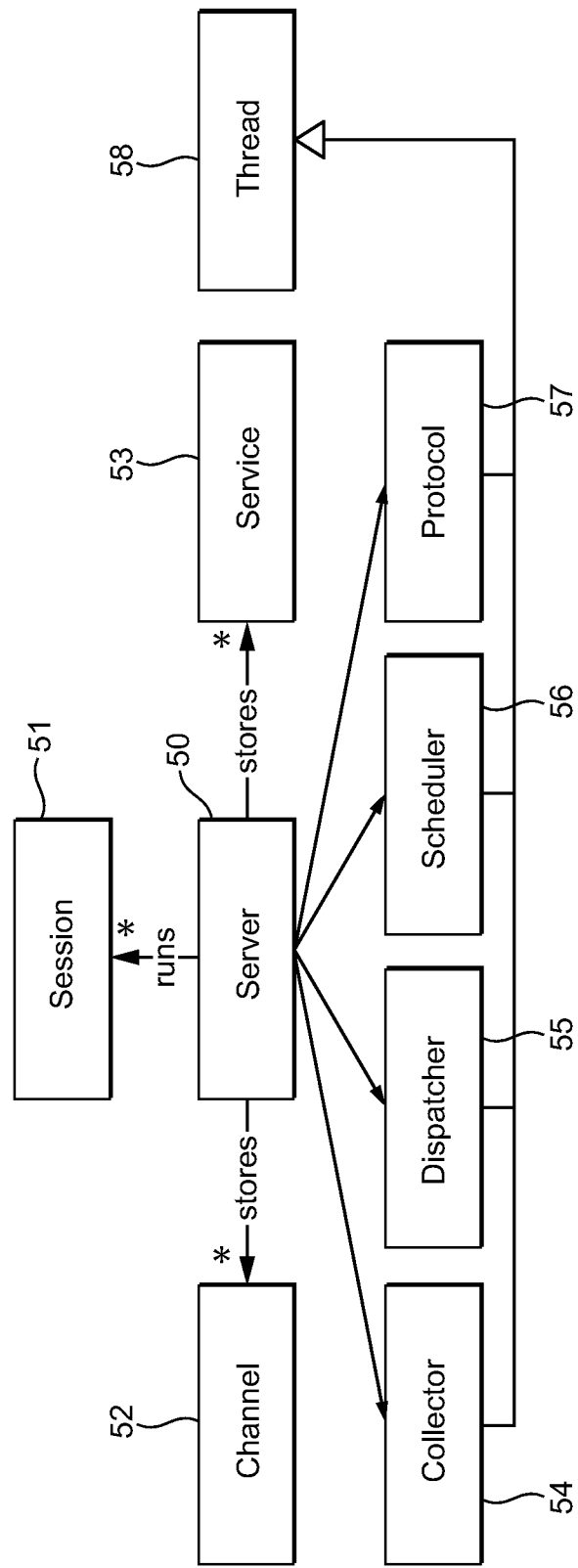
FIG. 5 is a schematic illustration of the server architecture.

FIG. 5 schematically illustrates the architecture of the system in terms of representative separate functional components, as managed by the JSON Server 50. The JSON server 50 maintains sessions 51 and allows the exchange of messages over channels 52. The messages are described as JSON objects associated with schema behaviours that are exposed as services 53. Both the channels 52 and the services 53 are stored by the JSON server in its service registry (not shown). The server comprises further software defining a Collector process 54, a Dispatcher process 55, a Scheduler process 56, and a protocol process 57. Each of these processes operates using threads 58. These will be described in more detail below.

It will be appreciated that the JSON servers in each of the modules described above provide largely the same underlying capability, tailored to its role in the distributed system. For the purposes of illustration however, operation of the server will now be described from the point of view of the STB module 30. In this context, particular STB functionality services might include Tuner, EPG, DVR, Player modules for example.

The protocol process defined by the protocol service schema maintains sessions across the distributed architecture. It enables the middleware and applications to filter objects related to the session by ID, to identify object sequences, to manage the creation of channels that are used for communication between different entities, and to relate requests and responses to one another.

The protocol service 57 is used to start (or bind) a session as an instance of a service to the server 32, end a session (or unbind it from the server) and publish a service description to the service registry. In this regard, the protocol process is itself a service, and can be implemented in Service Orientated Javascript (SOJ). The protocol behaviour consists of connect, disconnect and publish operations which are described by way of example in connection with FIG. 6. These operations are themselves defined by schemas. A service schema, a Session Schema, and a Provider Schema are also provided.

The connect operation allows the Protocol service to start new sessions. This is also referred to as binding an application to a service. The input message of the asynchronous connect call is a Connect message and the output message is a Session message.

The Connect schema set out in the table below serves to connect a service and expose its schemas in a new session. The maximum number of sessions is determined by the system at startup.

Protocol: Connect Schema

| Field | type | optional | Description |
|---|---|---|---|
| Connect | object | false | Starts a new service session at a provider via a mutually supported protocol |
| Connect.v | string | false | version string (formatted major.minor revision) |
| Connect.protocol | string | false | connection type Note: only in client Connect, not in server Connect. |
| Connect.address | string | false | address including port Note: only in client Connect, not in server Connect. |
| Connect.username | string | true | User name, default: guest |
| Connect.password | string | true | Password |
| Connect.service | string | false | request a session for this service |

The Session schema illustrated in the table below serves to start a new session at a provider and make the client aware of its new session ID. In addition to the session ID the service description is returned to allow the client to check if it is compatible with the provider. Furthermore, it is the session schema maintains sessions across the distributed architecture and that allows the middleware an other applications to filter objects related to the same session by ID. Because all of the objects are part of a session, all objects are wrapped in a session object.

Protocol: Session Schema

| Field | type | optional | Description |
|---|---|---|---|
| Session | object | false | Starts a new service session at a provider via a mutually supported protocol |
| Session.v | string | false | version string (formatted major.minor revision) |
| Session.sid | string | false | new session id |
| Session.service | string | false | session service description |

The Disconnect operation allows the Protocol service to disconnect a client from a service provider and end the associated session. This is also referred to as unbinding an application from a service. The Disconnect schema, indicated in the table below generates no output.

Protocol: Disconnect Schema

| field | type | optional | Description |
|---|---|---|---|
| Disconnect | object | false | The Disconnect schema serves to disconnect from a service and close an open JSON session. |
| Disconnect.v | string | false | version string (formatted major.minor revision) |
| Disconnect.protocol | string | false | connection type Note: only in client Connect, not in server Connect. |
| Disconnect.address | string | false | address including port Note: only in client Connect, not in server Connect. |
| Disconnect.sid | integer | false | session id |

The Publish operation serves to publish the capabilities of a service end-point (or device). The service registry maintained by the server stores the service and redirects requests to the end-point location. The table below sets out details of the schema. Note that a Provider message is transmitted to a service registry but that the message does not contain the location of the service registry or the protocol according to which the message is transmitted, for the middleware architecture this is considered out of bounds.

Protocol: Publish Schema

| field | type | optional | Description |
| --- | --- | --- | --- |
| Provider | object | false | The Provider schema serves to publish services to the service registry. |
| Provider.v | string | false | version string (formatted major.minor revision) |
| Provider.name | string | false | provider name |
| Provider.address | object | false | device location |
| Provider.protocols | array | false | device name |
| Provider.protocols[n] | string | true | Protocol name. HTTP GET/POST, TCP, eLink |
| Provider.services | array | false | |
| Provider.services[n] | object | true | Exposed service |

When a service implementation is registered to a service it receives notifications of started and ended sessions and received data types. A notification contains a session object when it is started or stopped and a Function object when data is received. A Function object is a dynamic API associated with a session and implements an operation. Depending on its operation's message pattern a Function instance acts as an input message API and/or an output message API. In particular input API's are get functions to retrieve data fields and output API's are set functions to set fields in output messages.

Function instances are associated with a session and an operation to which input and output message types are associated. Functions and their associated incoming calls are the abstraction about which the underlying system is notified via callback functions. The underlying operation of these will be described in more detail below. Typically, multiple Function instances may exist of the same Operation within different sessions, e.g. separate sessions may control separate tuners. After receiving a notification an underlying system process may open the messages associated with the notification. The Function can be used to read from a message. This results in an AST that can be manipulated using the schema interface. Typically the system retrieves values, sets values and sends the object before closing the object, which results in the AST being deleted.

The system's various calling functions will now be described in more detail.

More will now be said about the Dispatcher 55. Objects are sent and received by the middleware via communication channels and sent to and from the underlying system via schema interfaces. The channel abstraction is exposed to the system to register receive callbacks to communication modules with the middleware. The Dispatcher 55 is the middleware process that dispatches incoming messages representing remote calls. It receives messages via communication channels created for the Session and Function associated with the message and notifies the underlying system by means of an observer pattern.

In order to do this the incoming calls are pre-parsed when introduced into the system to retrieve the schema type, request ID, session ID. The pre-parser is light-weight to ensure high object throughput of the middleware and aims to achieve a high quality of service for the services that are exposed via the middleware. The pre-parser requires that the data part of the message is the last field in the JSON literal. This restriction only applies to the pre-parser, not the JSON SDK parser.

Figure 7:
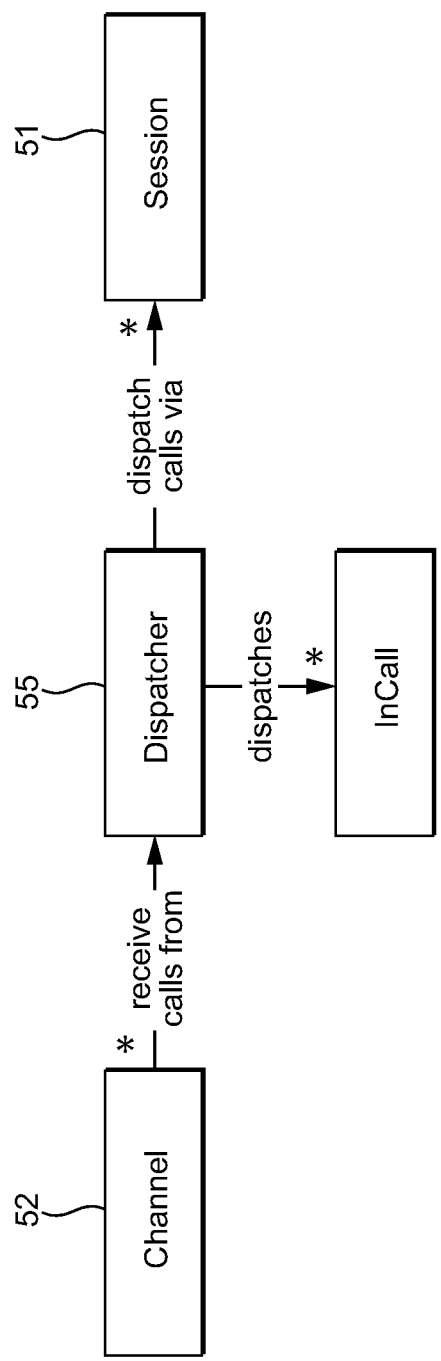
FIG. 7 is a schematic illustration of a dispatcher function.

FIG. 7 shows decomposition of the dispatcher abstraction. As can be seen in the diagram, a dispatcher instance receives call from a channel, and dispatches these to a session instance.

Referring again to FIG. 5, the Scheduler 56 is a middleware process that sends outgoing objects to distributed application modules via communication channels in such a way that the applications function well. This implies that the system may produce outgoing calls in a different order than is optimal for an adequate quality of service of the services exposed to the applications. In order to allow for flexibility for the various concurrent sessions and services exposed via the middleware a strategy pattern is used to choose which objects to send via output channels first.

Strategies patterns include:
1. The first in, first out (FIFO) strategy does not take into account some calls may be more critical to the client than others.
2. The default priority strategy schedules outgoing objects by the priority defined in the service description's operation part.
3. A custom strategy which defines the intricate dependencies operations, services and user/security levels. A more detailed draft of this strategy requires that user levels and security constraints are described.

Referring again to FIG. 5, the Collector 54 is the middleware process that is responsible for the memory management of incoming calls. The need for a garbage collector is justified by two design decisions. Firstly, a service observer may never use the resource if it does not behave as expected. Therefore the memory of an incoming call belongs to the middleware, not the underlying service back-end. In this case a time-out is reached and the call is recycled. Secondly, services may be observed by multiple system modules which can each affirm they have finished processing the incoming call. This is done by calling the junk function. When a call's keep count is zero it is garbage that the collector may collect and recycle. The garbage collector creates incoming calls, protecting them with a semaphore when requests enter the system and recycles them when their keep count is zero or the time-out is reached. When a call is recycled its semaphore is added to the pool of semaphores managed by the collector.

In practice therefore, the software services described above allow the STB to be controlled by means of a web browser running on a remote client device 30, or alternatively via a tooling module 34 or control application 36. Local interaction with the tooling module 34 or control application 36 can similarly be via a web browser or dedicated user interface. By means of the logically separated local servers 321, 342, and 361 and user interfaces, control signals can be parsed and transmitted to the STB where they are put into effect.

For example, the tooling device 34 can be configured to carry out an Advanced Data Inserter (ADI) function, in which video streams, at a specified bit rate, symbol rate and PID remapping can be transmitted to the STB for maintenance and diagnostic purposes. In this context, the tooling device therefore provides a web interface providing appropriate input fields, and drop down menus for control, as well as buttons for starting and stopping and the video stream. Status information updated in real time, the identity of the user currently controlling the ADI may also be provided on an overview webpage can also show which of one or more ADIs are in use.

The ADI function therefore involves an ADI services specification for configuring, starting and stopping streams, and retrieving available streams from a memory; a web page hosted on the server for configuring the ADI, and which makes use of the ADI services on each ADI configured computer.

A further aspect of the system is the control module 36. Using the schema model described above, the control application 36 can control the tooling device to run automated diagnostic and maintenance operations on the STB, as well as control the STB directly by providing video, signal, and power commands, or by providing updated user interface display items via the web server located on the STB. The control application is also operable to download software to the STB, such as an operating system, or STB functional module.

A distributed system architecture has therefore been described for control of a Set Top Box (STB). The architecture employs server software implemented as JSON middleware, and provided on the STB 32 as a local server, as well as on a Tooling Device 34 and a Control Application 36. The distributed system facilitates communication with the STB over a data network such as the internet. A remote client device running a browser 30 can interact with the STB 32 to access STB functionality 32.

The embodiments described above are intended to illustrate examples of the invention, not to limit the scope invention, which is defined by the following claims. It will be appreciated that alternative embodiments will occur to the skilled person falling within the spirit and the scope of the claims.

We claim:

1. A system providing control of a Set Top Box (STB) over a data network, the system comprising:
    an STB, having a processor on which JavaScript Object Notation (JSON) server software is installed, wherein the JSON server software is operable to connect to a data network, further having a plurality of modules in communication with the JSON server software via a plurality of XMLHttpRequest (XHR) application programming interfaces (APIs); and
    a remote tooling device, separate from the STB, having a JSON client software installed, wherein the JSON client software is in communication with the JSON server software via a JSON middleware, wherein the JSON middleware is configured to use JSON as object serialization format to provide a service description between the STB and the remote tooling device which form complex services and applications discoverable by the remote tooling device for interfacing with the STB, and wherein the remote tooling device is configured to run debugging and routine maintenance operations on the STB across the JSON middleware;
    wherein the JSON server software of the STB allows the remote tooling device to access the STB remotely and act as a client of the STB while running operations;
    wherein the JSON server software is operable to:
        maintain a service registry in which services are registered, where advanced data inserter (ADI) services are provided via the remote tooling device according to an ADI services specification; and
        manage one or more sessions for communication between the STB and the remote tooling device where the remote tooling device carries out an ADI function according to the ADI services specification for configuring, starting and stopping maintenance and diagnostic streams transmitted to the STB at a specified bit rate, symbol rate, and PID remapping, and retrieving available streams from a memory.

2. The system of claim 1, further comprising a client device having a web browser for connecting to a data network, wherein the web browser comprises a user interface and a HTTP request communication module.

3. The system of claim 1, wherein the remote tooling device comprises:
    a user interface.

4. The system of claim 1, further comprising a control module for providing control signals to the STB and or the remote tooling device, wherein the control module comprises JSON server software operable to allow the tooling remote device to access and act as a client of the control module.

5. The system of claim 4, wherein the control module is operable to install one or more of a new operating system, a user interface, or STB functional modules on the STB.

6. The system of claim 4, wherein the control module is separate from both the remote tooling device and the STB.

7. The system of claim 6, wherein the control module is operable to send control signals to the STB during maintenance or upgrade operations, and wherein the control signals comprise remote control of the STB to activate power switches of the STB, activate tuning operations of the STB, and activate user interface inputs of the STB.

8. The system of claim 7, wherein the control module comprises back-end control modules comprising a functionality of the control signals for remotely controlling the STB.

9. The system of claim 6, wherein the control module is operable to send control signals to the remote tooling device for synchronization.

10. The system of claim 1, wherein the data network is an internet.

11. The system of claim 1, wherein the remote tooling device is configured to transmit diagnostic video streams to the STB at a specified bit rate, symbol rate, and PID remapping.

12. A computer-implemented method for controlling a Set Top Box (STB) via a data network, the computer-implemented method comprising:
    installing JavaScript Object Notation (JSON) server software on a processor of the STB, wherein the JSON server software is operable to connect to a data network;
    implementing a plurality of modules in communication with the JSON server software via a plurality of XMLHttpRequest (XHR) application programming interfaces (APIs);
    installing at a remote tooling device, separate from the STB, a JSON client software, wherein the JSON client software is in communication with the JSON server software via a JSON middleware, wherein the JSON middleware in configured to use JSON as object serialization format to provide a service description between the STB and the remote tooling device which form complex services and applications discoverable by the remote tooling device for interfacing with the STB, and wherein the remote tooling device is configured to run debugging and routine maintenance operations on the STB across the JSON middleware;
    wherein the JSON server software of the STB allows the remote tooling device to access the STB remotely and act as a client of the STB while running operations;
    wherein the JSON server software is operable to:
        maintain a service registry in which services are registered, where advanced data inserter (ADI) services are provided via the remote tooling device according to an ADI services specification; and
        manage one or more sessions for communication between the STB and the remote tooling device where the remote tooling device carries out an ADI function according to the ADI services specification for configuring, starting and stopping maintenance and diagnostic streams transmitted to the STB at a specified bit rate, symbol rate, and PID remapping, and retrieving available streams from a memory.

13. A non-transitory, computer-readable medium for controlling a Set Top Box (STB) via a data network having sets of instructions stored thereon which, when executed by a computer, cause the computer to:

install JavaScript Object Notation (JSON) server software on a processor of the STB, wherein the JSON server software is operable to connect to a data network;

implement a plurality of modules in communication with the JSON server software via a plurality of XMLHttpRequest (XHR) application programming interfaces (APIs);

install at a remote tooling device, separate from the STB, a JSON client software, wherein the JSON client software is in communication with the JSON server software via a JSON middleware, wherein the JSON middleware in configured to use JSON as object serialization format which provides a service description between the STB and the remote tooling device which form complex services and applications discoverable by the remote tooling device for interfacing with the STB, and wherein the remote tooling device is configured to run debugging and routine maintenance operations on the STB across the JSON middleware;

wherein the JSON server software of the STB allows the remote tooling device to access the STB remotely and act as a client of the STB while running operations;

wherein the JSON server software is operable to:

maintain a service registry in which services are registered, where advanced data inserter (ADI) services are provided via the remote tooling device according to an ADI services specification; and manage one or more sessions for communication between the STB and the remote tooling device where the remote tooling device carries out an ADI function according to the ADI services specification for configuring, starting and stopping maintenance and diagnostic streams transmitted to the STB at a specified bit rate, symbol rate, and PID remapping, and retrieving available streams from a memory.

\* \* \* \* \*